S. G. NEAL.
COMBINED OPERATING AND CONTROLLING MEANS FOR HYDRAULIC ELEVATORS.
APPLICATION FILED MAR. 31, 1909.

959,786.

Patented May 31, 1910.
6 SHEETS—SHEET 1.

S. G. NEAL.
COMBINED OPERATING AND CONTROLLING MEANS FOR HYDRAULIC ELEVATORS.
APPLICATION FILED MAR. 31, 1909.

959,786.

Patented May 31, 1910.

Witnesses:
H. H. Hunt.
W. H. Sheasby

Inventor:
Spencer G. Neal
By Albert H. Merrill
His Atty.

S. G. NEAL.
COMBINED OPERATING AND CONTROLLING MEANS FOR HYDRAULIC ELEVATORS.
APPLICATION FILED MAR. 31, 1909.

959,786.

Patented May 31, 1910.
6 SHEETS—SHEET 5.

Witnesses:
H. H. Hunt.
W. H. Sheasby.

Inventor:
Spencer G. Neal
By Albert H. Merrill
His Atty.

S. G. NEAL.
COMBINED OPERATING AND CONTROLLING MEANS FOR HYDRAULIC ELEVATORS.
APPLICATION FILED MAR. 31, 1909.

959,786.

Patented May 31, 1910.
6 SHEETS—SHEET 6.

Witnesses:
H. H. Hunt.
W. H. Sheasby

Inventor:
Spencer G. Neal
By Albert H. Merrill
His Atty.

UNITED STATES PATENT OFFICE.

SPENCER G. NEAL, OF LOS ANGELES, CALIFORNIA, ASSIGNOR TO CALIFORNIA VALVE AND AIR BRAKE COMPANY, OF PALMS, CALIFORNIA, A CORPORATION OF CALIFORNIA.

COMBINED OPERATING AND CONTROLLING MEANS FOR HYDRAULIC ELEVATORS.

959,786. Specification of Letters Patent. Patented May 31, 1910.

Application filed March 31, 1909. Serial No. 487,065.

To all whom it may concern:

Be it known that I, SPENCER G. NEAL, a citizen of the United States, residing at Los Angeles, California, have invented a new and useful Combined Operating and Controlling Means for Hydraulic Elevators, of which the following is a specification.

This invention relates to an arrangement of valves and valve operating means adapted both to control the movements of the elevator from the car during the movements of the car intermediate the upward and downward limits of its travel, and also to safety means combined with the controlling means to automatically limit the extreme upward and downward movements of the elevator.

Heretofore hydraulic elevators have been controlled from the car during their upward and downward movements by one valve, and an independent valve has been provided to limit the extreme upward and downward movements of the elevator car in case the operator fails to stop the car in time by operating the valve under his control. By this invention the two functions just referred to are performed by a single valve and the apparatus for controlling and operating the elevator greatly simplified.

An object of the invention is to provide an improved mechanism to operate the valve for limiting the extreme upward and downward movements of the elevator.

A further object of the invention is to provide valve-controlled conduits in communication with the pressure supply for operating the automatic means for limiting the upward and downward movements of the elevator car, instead of the present cables or ropes which are subject to wear and breaking.

Other objects and advantages may hereinafter appear to those skilled in the art to which the invention pertains.

The invention consists in the various parts, combinations of parts, and features of construction illustrated in the accompanying drawings, described in the specification, and then definitely pointed out in generic and specific claims.

Referring to the accompanying drawings which illustrate the invention, —Figure 1 is a somewhat diagrammatic side elevational view of the car of a hydraulic elevator provided with operating means constructed according to the principles of this invention. Fig. 1$^a$ is a cross section of valve 131 of Fig. 1 in the plane of port 133. Fig. 2 is a sectional detail of one of the valves shown in Fig. 1.

Figures 1, 1A, 2:
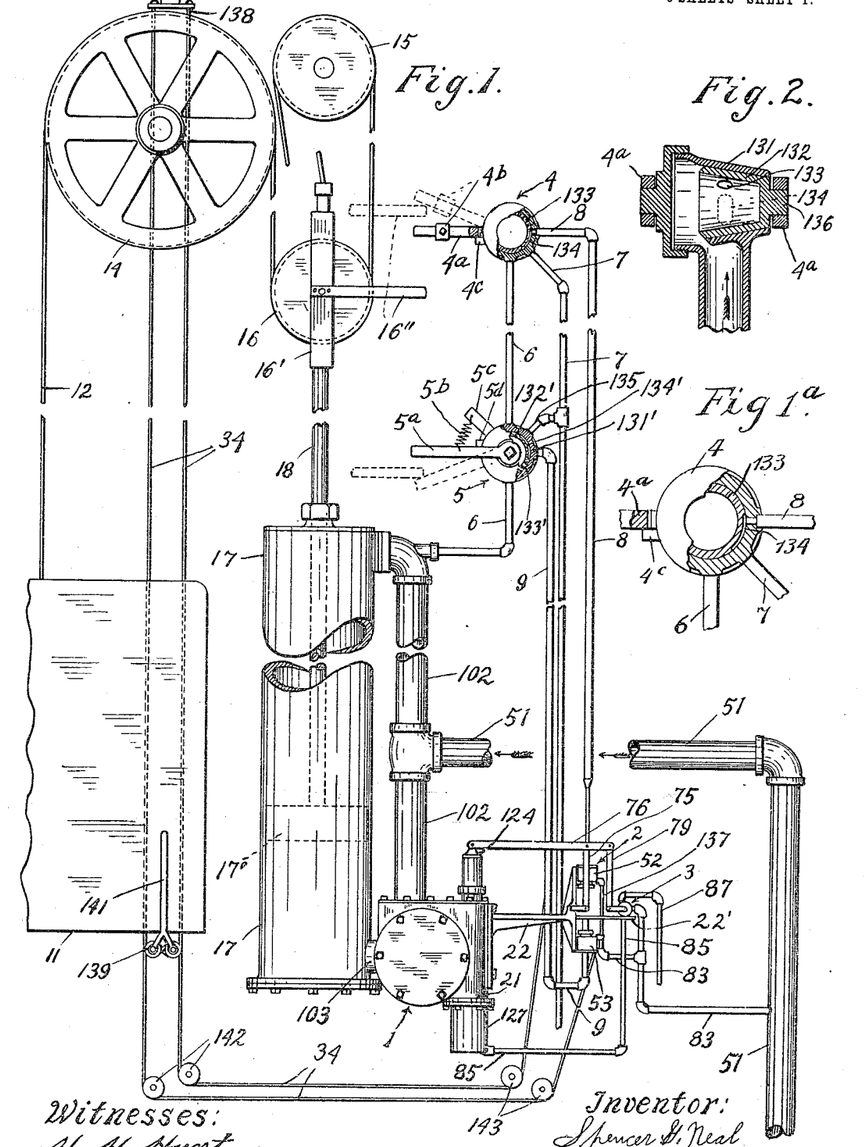

Referring more particularly to Fig. 1,— the invention relates to the construction of the main valve 1, the valve operating mechanism designated in a general way by the numeral 2, in combination with the pilot valve 3, top and bottom limit valves 4 and 5, and conduits 6, 7, 8 and 9 connected therewith. The other parts shown in Fig. 1 are of well-known construction and include the car 11, hoisting cable 12, main overhead sheave wheel 14, secondary overhead sheave 15, traveling sheave 16, main piston cylinder 17, and piston rod 18 upon the upper end of which is mounted said traveling sheave 16. To the valve operating cylinder 21 of the main valve 1 is attached a horizontal bracket 22 upon which is mounted in a bearing 23 a horizontal rock-shaft 24 provided with a radial arm 25. Upon shaft 24 is mounted inner wheel 31 and outer wheel 32, said outer wheel 32 being normally connected with inner wheel 31 to rotate therewith, but being at times detached therefrom to rotate independently thereof, as will hereinafter be more fully described. The bracket 22 is provided with an elongated horizontal arm 22' having a broadened end portion forming a horizontal support upon which the base 3ᵃ of the pilot valve is seated and attached by any suitable means as by the cap screws 3ᵇ. (See Figs. 3 and 9). Over the peripheral groove 33 with which the outer wheel 32 is provided, is passed the usual tiller rope or cable 34.

Figure 5:
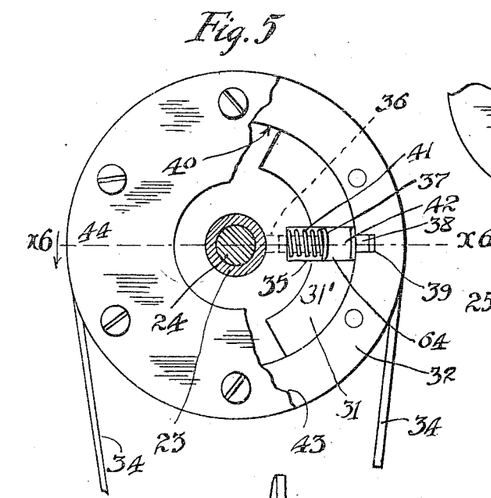
Fig. 5 is a view looking at the inner side of the tiller wheel, the shaft and bearing sleeve thereof being shown in section on line $x^5$ of Fig. 6.
Figure 6:
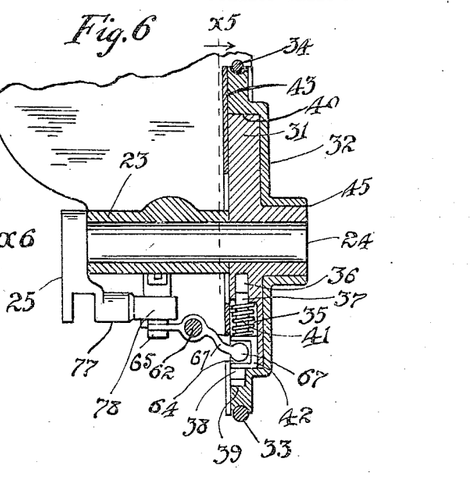
Fig. 6 is a transverse section on line $x^6$ of Fig. 5.

As shown in Figs. 5 and 6 the inner wheel 31 is provided with a radial slot 35 cut into the inner face thereof. Said slot terminates at its inner end in a bore 36 which forms guiding means for the inner end of the dog 37 which is mounted in said slot and bore to slide longitudinally thereof. The outer end of said dog is provided with a tooth 38 which slides into and out of engagement with a notch 39 with which the outer wheel 32 is provided on its inner periphery 40. Said dog is thus adapted, when operated as hereinafter described, to disconnectively secure the outer to the inner wheel to rotate therewith. 41 is a compression spring surrounding the dog 37 and adapted to engage the underside of the head 42 thereof thereby to normally cause the tooth 38 of the dog to move outwardly into engagement with the outer wheel 32. 43 is a plate which is secured by screws 44 to the inner side of the outer wheel 32 and which engages the inner side of the inner wheel 31 to prevent said outer wheel 32 from slipping off from said inner wheel. The inner wheel 31 is provided with a hub 45 which is keyed to the shaft 24 and which forms the main bearing surface for the outer wheel 32.

Figure 4:
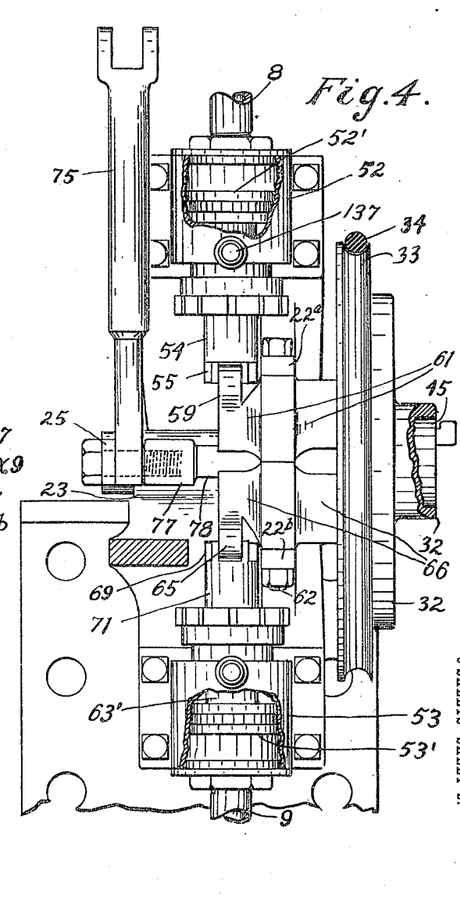
Fig. 4 is an elevation of Fig. 3 looking at the right end thereof.

The means just described for disconnecting the outer wheel 32 to render the same inoperative are put into operation, as will hereinafter be more fully described, when the elevator approaches its upper or its lower limit of travel so that at such times the elevator operator cannot operate the outer wheel 32 to cause the elevator to travel beyond the proper upper or lower limits. For the purpose of withdrawing the dog 37 from engagement with the outer wheel 32 when the elevator car approaches the upper and lower limits of its travel, and also to operate the pilot valve to stop the elevator car as will be explained later, the downward limit valve 4 and upward limit valve 5 are provided. (See Fig. 1). The sheave frame 16' is provided with a horizontal arm 16'' which, when the elevator car approaches the upward limit of its travel engages an operating arm 5ᵃ with which the valve 5 is provided, and when the elevator approaches the lower limit of its travel said arm 16'' engages an arm 4ᵃ with which the valve 4 is provided. In each instance the valves 4 and 5 are so operated as to direct the fluid through pipes 6, 7, 8 and 9 in a manner to operate a piston 52' of a piston cylinder 52 and a piston 53' (see Fig. 4) in a cylinder 53 thus to operate certain automatic means to stop the elevator car before it exceeds either the upward or downward limit of its travel. The cylinders 52 and 53 will be termed limit cylinders by reason of the part they have in performing the function of limiting the upward and downward movements of the elevator car. The limit pistons 52' and 53' operate means for withdrawing the dog 37 from engagement with the outer wheel 32.

From the lower end of the upper piston cylinder 52 extends a plunger 54 which carries at its lower end a roller-carrying member 55, said member being provided at one end with a guiding wheel 56 which travels in a guiding groove 57' formed in a vertical rail 57, and at its other end with a cam roller 58, which engages one side of an inclined wing 59. Said wing 59 forms part of a lever 61 which is pivoted upon the vertical shaft 62, said shaft being shown in section in Fig. 6, and having its bearings in short horizontal arms 22ᵃ and 22ᵇ with which bracket 22 is provided. The other end of said lever 61 is furnished with a broad arm or extension 63 which is curved at its outer end, and at that end fits in a notch or recess 64 which extends across the head 42 of the dog 37. Said broad extension 63 is curved so that when the inner wheel 31 is rocked or partially rotated, the dog 37 carried by said wheel will slide along the end of the extension 63 without there being any radial movement of said dog. When the valve 4 (see Fig. 1) is operated by reason of the arm 16'' engaging the arm 4ᵃ of said valve, the fluid is admitted against the upper side of piston 52' and the plunger 54 depressed carrying with it the roller 58 so that said roller 58 engages the beveled face of upper wing 59 thereby turning the lever 61 upon its shaft 62 and operating said lever thus withdrawing the tooth 38 of dog 37 from the notch 39 of the outer wheel 32 and disengaging said outer wheel 32 from the inner wheel 31. A similar arrangement of parts is provided below the lever 61, namely a lower wing 65 formed on a lower lever 66 having an arm 67 to perform the same function as arm 63 of the upper lever 61. Lower cam roller 68 is carried by a member 69, mounted on the upper end of the plunger 71 which projects upwardly from the lower piston 53'. 56' is the lower guide roller. The levers 61 and 66 operate independently of each other and contact with each other where they surround the shaft 62, but the extensions 63 and 67 of said levers are spaced apart from each other at their outer ends slightly more than the width of the recessed portion of the dog 37. The tooth 38 cannot enter notch 39 until it slips off from the wing extension 63 or 67, which only occurs when arm 25 is brought to the position shown in Figs. 3 and 4 to so operate the pilot valve as to lap the ports of the main valve 1. This last operation is performed by the descent of upper plunger 54 or ascent of lower plunger 71. At this time the dog tooth 38 slides upon the inner periphery of the outer wheel member 32. It is obvious that groove 31' must be long enough to permit the necessary oscillation of the tiller-wheel without interference by the engaging edges of the levers 61 and 66. It is also obvious that it is necessary that the edges of the wings 63 and 67 shall pass freely into and out of the notch in the dog while the tiller wheel is being oscillated by the manual actuating devices, and in order that said wings shall aline with the notch and freely enter the same the inner and outer walls of the notch may be slightly beveled, as shown in Fig. 5, or other suitable means may be employed to insure said alinement.

The crank arm 25 carries the upright operating rod 75, to the upper end of which is pivoted the usual equalizing lever 76. Said crank arm 25 is provided with a lateral extension 77, which has a reduced end portion 78 against the opposite sides of which the members or heads 55 and 69 of the upper and lower plungers strike.

To the short end of the equalizing lever 76 is pivoted the depending pilot valve rod 79. The pilot valve, (designated in a general way by the numeral 3 in Fig. 1) is provided with a frusto-conical casing 81 (see Figs. 3 and 9) having a casing inlet port 82 which communicates with pipe 83, said pipe 83 leading from the pressure supply pipe 51. Said pilot valve casing 81 is also provided with a piston supply port 84 and a piston discharge port 84' communicating with the supply and discharge pipe 85, and with a discharge port 86 which communicates with a discharge pipe 87.

Figure 3:
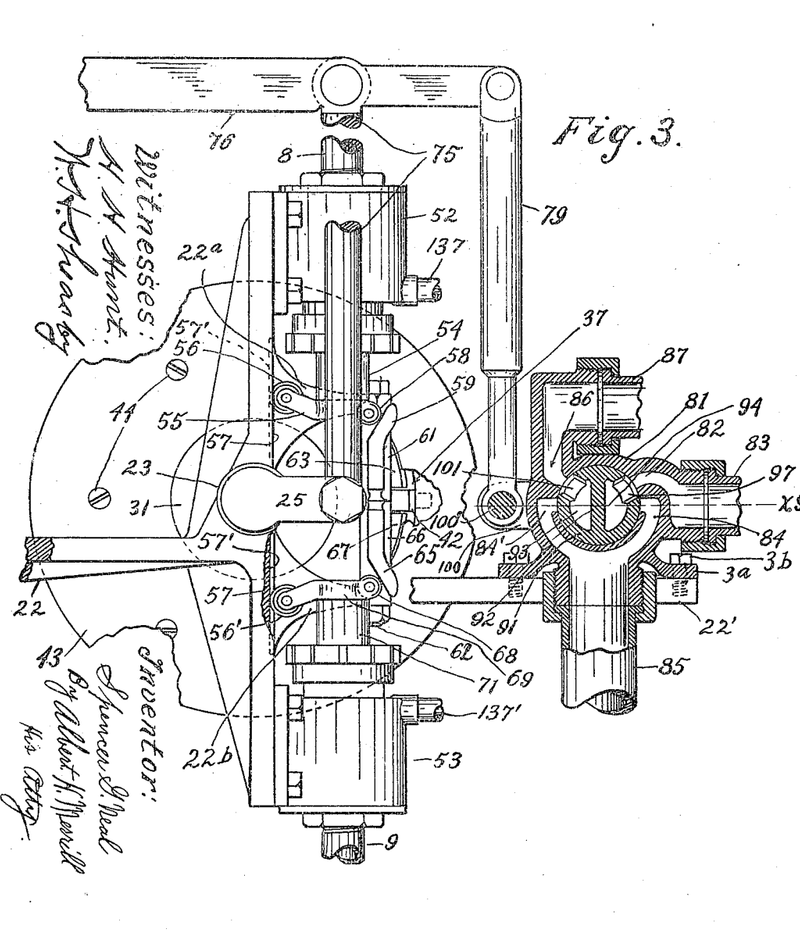
Fig. 3 is a broken side elevation partly in section showing the pilot valve and a portion of the hydraulic means for operating the same.
Figures 7, 8, 9:
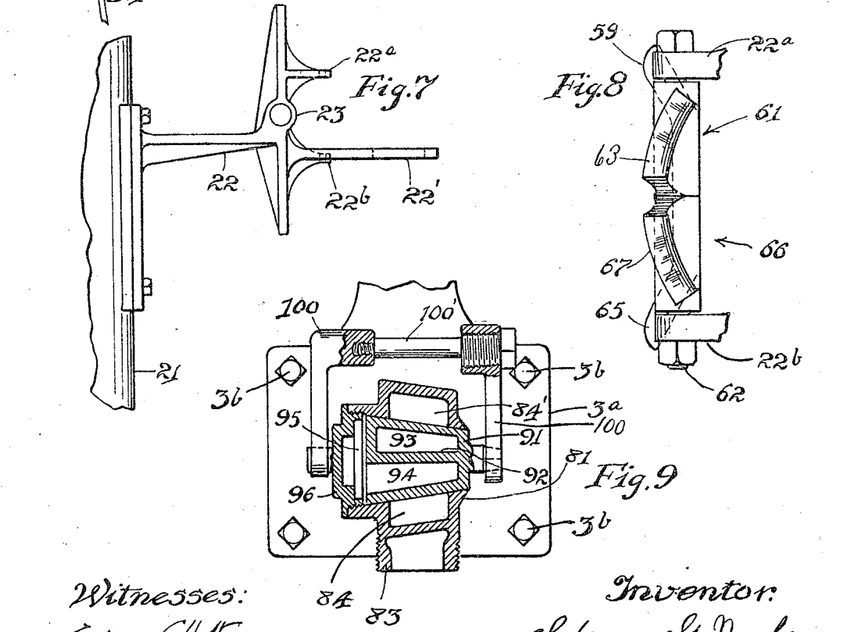
Fig. 7 is a side elevation of the bracket which supports the mechanism shown in Figs. 3 and 4.
Fig. 8 is an end elevation of a detail of the operating means shown in Figs. 3 and 4.
Fig. 9 is a transverse section of the pilot valve on line $x^9$ of Fig. 3.

Within the pilot valve casing 81 is rotatively fitted a frusto-conical hollow valve plug 91 provided with a longitudinal partition 92 which forms a closed chamber 93 in one side of the valve plug and a chamber 94 in the other side of the valve plug, said chamber 94 being open at the large end of the valve plug to supply pressure to the clearance 95 which is provided under the cap 96 which closes the large end of the valve casing. Said chamber 94 permits the pressure from the supply to at all times keep the valve plug snugly down to its seat. Said plug is provided with a radial pressure port 97 which is of sufficient circumferential extent to establish communication between the casing port 82 and the piston supply port 84. On the other side of the valve plug, discharge port 101 coöperates with ports 84' and 86. The plug pressure port 97 establishes and cuts off communication between the casing ports 82 and 84. The pilot valve 3 is provided with a radial operating yoke 100 having a connecting-pin 100' to which the lower end of pilot valve rod 79 is connected as shown in Figs. 3 and 9.

From the supply main 51 the pressure is supplied to the lower end of piston cylinder 17, which contains the piston 17', by means of the branch pipe 102 through the main valve 1 and thence by means of the stub pipe 103 to the lower end of the piston cylinder 17. The upper portion of the branch pipe 102 leads into the top of cylinder 17 in a well-known manner.

Referring now to the internal construction of main valve 1,—the case 104 thereof is provided with a frusto-conical bushing 104' which forms the valve seat and is held in place by a retaining ring 104'' and cap screws 104$^s$. Within said seat is rotatively fitted a frusto-conical hollow valve plug 105, (omitted from Fig. 14) said plug being closed at the small end and divided longitudinally by partition 106 into the chambers 107 and 108, chamber 108 being closed at both ends and chamber 107 is closed at the small end and opened at the large end. The object of leaving the chamber 107 open at the large end is to admit pressure from the interior of the valve at all times to the clearance chamber 109 at the large end of the valve to cause the pressure to hold said valve to its seat. The pressure in chamber 104 furnishes the necessary constant pressure upon the upper face of piston 126.

Figures 12, 13:
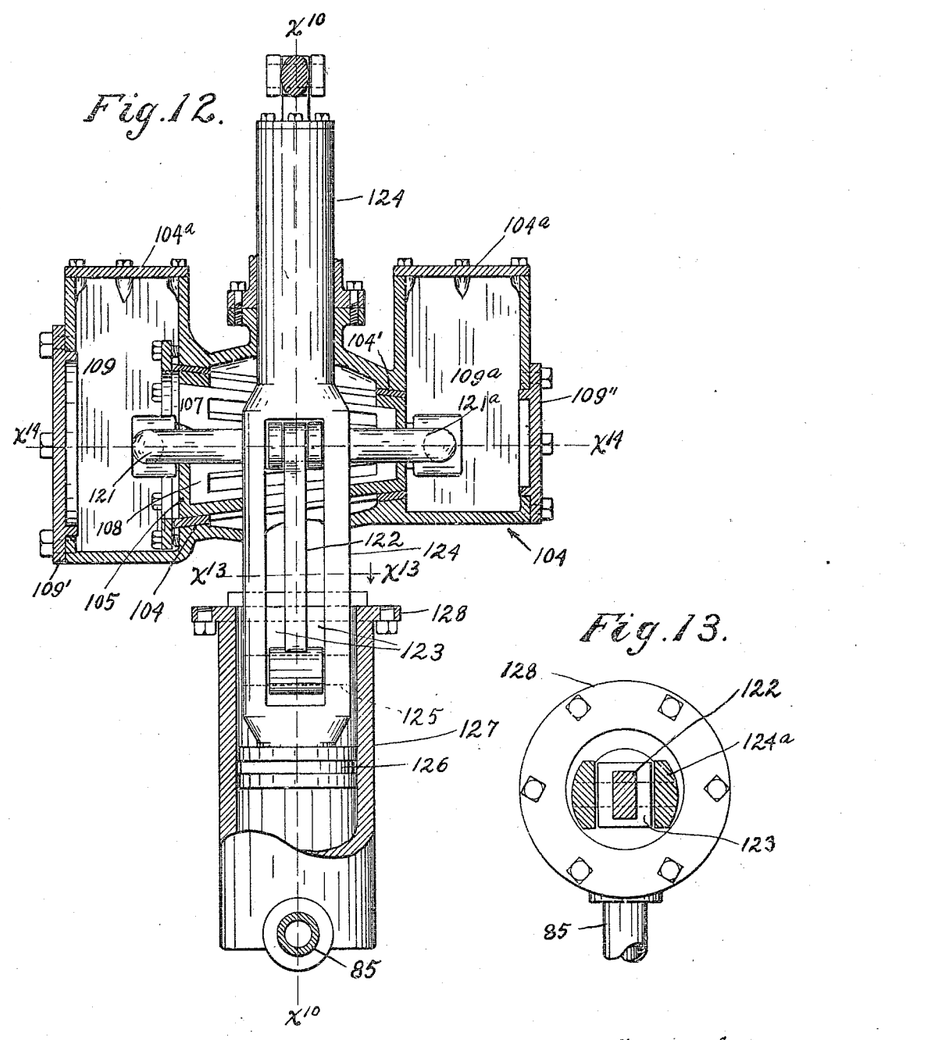
Fig. 12 is a vertical section on line $x^{12}$ of Fig. 10.
Fig. 13 is a transverse section on line $x^{13}$ of Fig. 12.
Figures 14, 15, 16:
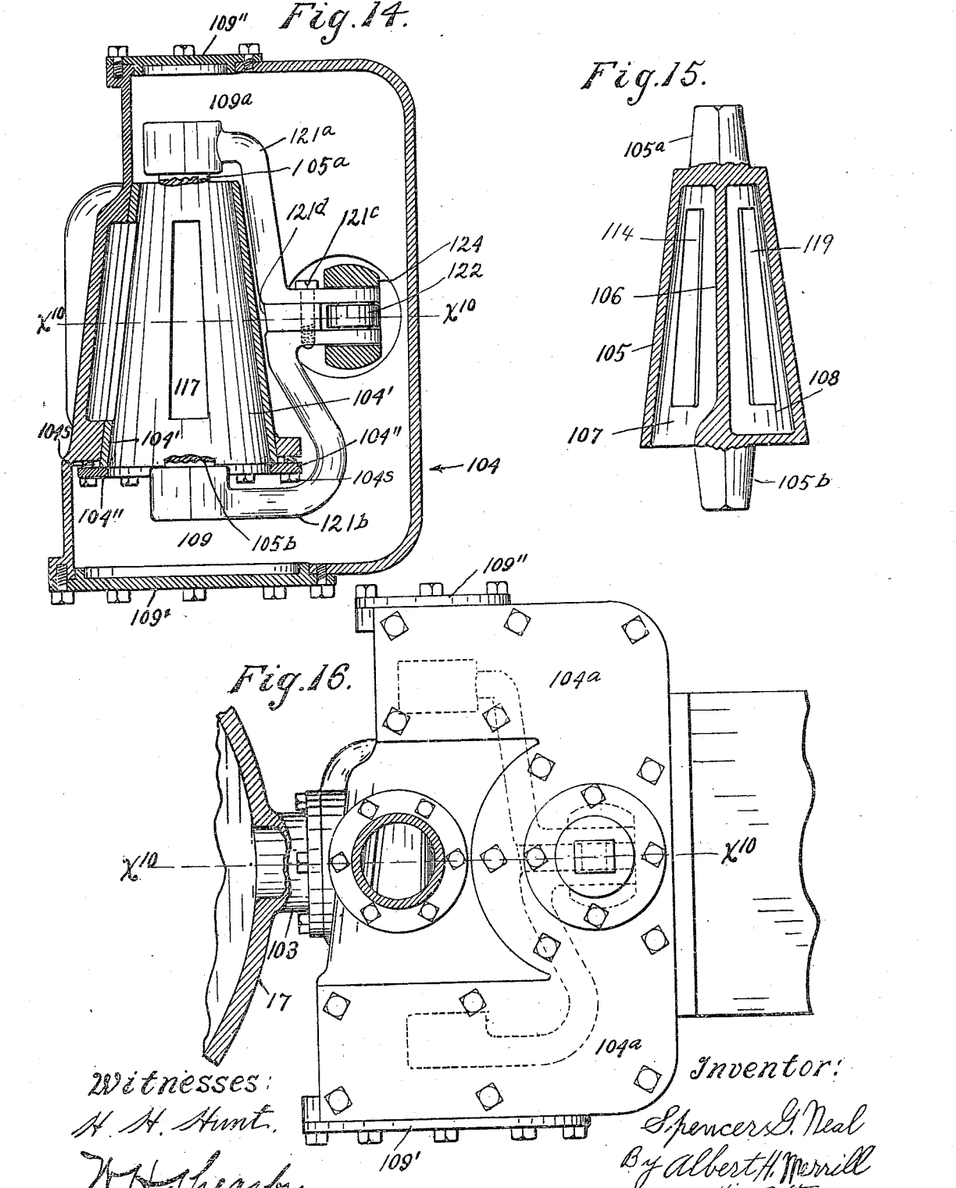
Fig. 14 is a transverse section on line $x^{14}$ of Figs. 10 and 12.
Fig. 15 is a view of the valve plug of Fig. 12 separately shown for clearness of illustration.
Fig. 16 is a plan of the main valve.

The casing 104 of the main valve 1 is also so constructed as to form a chamber 109$^a$ at and around the small end of the valve plug. It will be seen that this construction entirely obviates the need of using stuffing boxes. The top of the valve casing 104 is provided with a U-shape cover or top plate 104$^a$, the limbs of which cover the tops of the chambers 109 and 109$^a$, as shown in Figs. 12 and 14.

From the pressure supply branch 102 (see Fig. 10) the pressure enters a circulating casing port 111. The valve plug 105 is provided with an inlet 112 of more than twice the circumferential extent of the casing port 111, in order to prolong communication between said ports 111 and 112 during the operation of the valve.

In order to maintain constant pressure within the valve compartment 107, the plug is also provided with a port 114 which comes into register with casing port 111 before a clock-wise movement of the plug can bring port 112 out of register with port 111. Said port 114 also coöperates with a casing port 115 which leads to the cylinder 17 by way of the stub pipe 103. The ports of the main valve thus far described are provided to open and close communication between the supply branch pipe 102 and the lower end of the main piston cylinder 17 of the elevator.

The means will now be described for opening and closing communication between the stub pipe 103 and a discharge passage or pipe 116 which discharges the water from the cylinder permitting the pressure from the supply to cause the elevator to ascend. For this purpose the valve casing is provided with a discharge port 117 which communicates with said discharge pipe 116, and a discharge port 118 is provided in the valve plug to coöperate with said casing port 117.

119 is a plug port which coöperates with casing port 115 to open and close communication between the pipe 103 and the chamber 108 and thence by way of ports 117 and 118 to permit a discharge of fluid from the bottom of cylinder 17 out of discharge passage 116.

The double operating arm of the main valve comprises an arm $121^a$ which is fitted to the stem $105^a$ at the small end of the plug 105, and an arm 121 which is fitted to the stem $105^b$ with which the large end of the valve plug 105 is provided. Said arms $121^a$ and 121 are desirably fastened together by means of a bolt $121^c$ which passes through said arms and also through a spacing block $121^d$.

$121^b$ designates the pin for pivotally connecting the arms $121^a$ and 121 to the upright connecting rod 122. Said rod and arm are located within a vertical slot 123 with which the plunger 124 is provided. Said rod 122 extends down into the lower portion of slot 123 and is there pivotally connected with the lower portion of plunger 124 by means of a pivot pin 125.

126 designates the piston head carried by the lower end of plunger 124.

$124^a$ is a stuffing box around plunger 124. The cylinder 21 is provided with a lower extension 127 into which is slidably fitted the piston head 126, said head being limited in its travel to said portion 127 which preferably consists of an elongated cap provided with a flanged portion 128 which is fastened by cap screws to a like flanged portion 129 with which the cylinder 21 is provided. The movements of piston head 126 are controlled by the pilot valve 3 (see Fig. 1) which causes fluid to flow through the pipe 85 into the lower end of the cylinder extension 127, or permits fluid to be discharged from said extension through pipe 85 thence out the discharge port 86 and pipe 87 of the pilot valve.

Figures 10, 11:
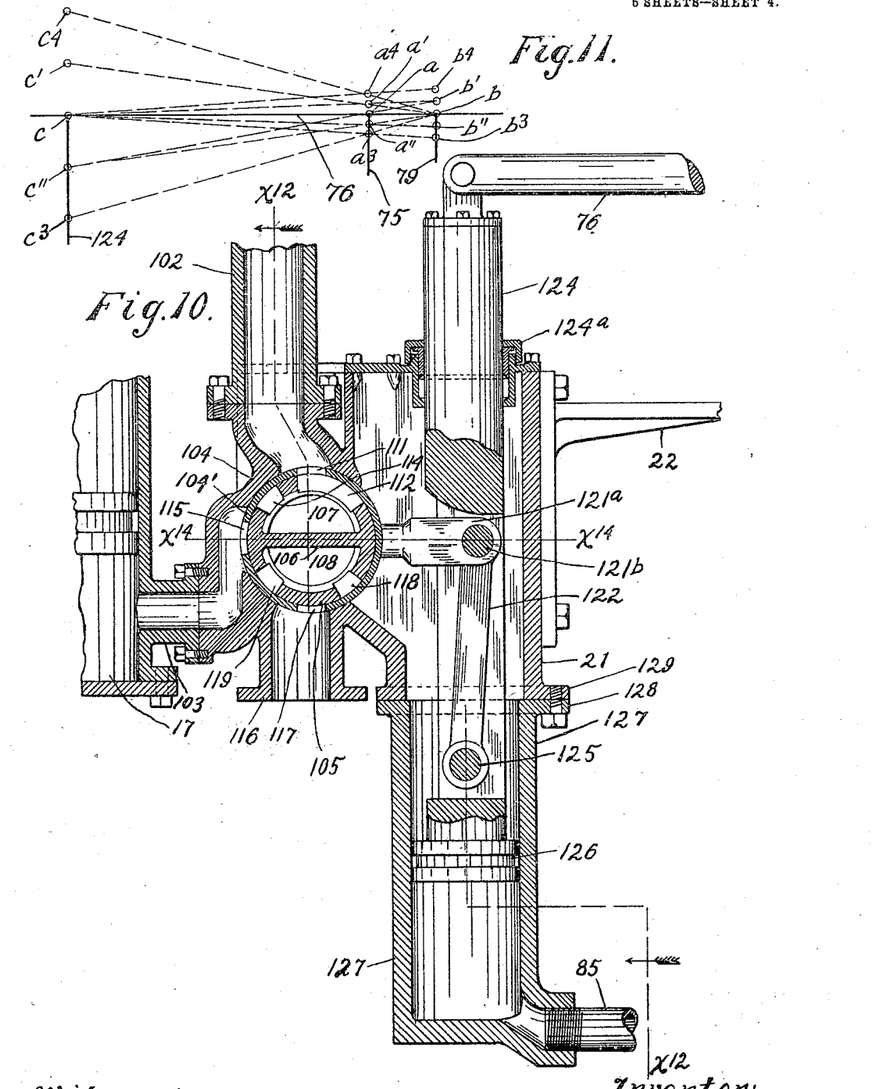
Fig. 10 is a vertical section of the main valve on line $x^{10}$ of Figs. 12, 14 and 16.
Fig. 11 is a diagram to illustrate the movements of the equalizing lever.

The connecting rod or link 122, well shown in Fig. 10, connects the valve arms with the plunger 124 in a manner that practically neutralizes the frictional side thrust due to the change in angularity between the arms and plunger 124 as the plunger rises and falls.

The chamber 109 may be provided with a large opening covered by a detachable plate 109′ in order that the valve plug may be inserted into the casing when the parts are assembled. A detachable plate 109″ may also be provided at the side of the chamber $109^a$ to permit inspection and to provide an additional opening to assist in assembling the parts.

The arrangement of the top and bottom limit valves 4 and 5 and various pipes for transmitting the fluid will now be described with a view to making clear the manner in which the operation of the handles $4^a$ and $5^a$ by an arm 16″ extending from the traveling sheave 16 causes the dog 37 carried by the inner member 31 to be withdrawn from engagement with the outer member 32.

From the upper end of the branch pipe 102, which is always in communication with the main supply pipe 51, leads the limit supply pipe 6 already referred to. Referring to Fig. 2, said pipe 6 leads into the large ends of valve casings 131 and 131′, thus admitting pressure to the interior of the hollow plug 132 and a port 133 therein. Said port 133 opens and closes the communication between the interior of the plug and the pipe 8 which supplies pressure to piston cylinder 52 to limit the downward movement of the elevator car. A segmental exterior groove 134 opens and closes communication between the top limit supply pipe 8 (which supplies pressure to cylinder 52 already referred to) and the discharge pipe 7. The valve 5 is provided with a similar arrangement in respect to its casing 131′, plug 132′, radial port 133′ and groove 134′, except that said groove and port are reversely arranged to the arrangement of valve 4. From the valve 5, a pipe 135 leads to the pipe 7. 9 is the top limit supply pipe, to which passing reference has already been made, which supplies pressure to the lower end of cylinder 53 to limit the upward movement of the elevator car. Segmental groove 134′ controls communication between said pipes 135 and 9, and the port 133′ controls communication between pipes 6 and 9. Each of the limit valves are provided with an operating stem 136 to which the handle $4^a$ or $5^a$ is attached.

The arm $4^a$ is provided with a weight $4^b$ to cause the same to return more positively to a normal position after being lifted by the traveling arm 16″, and the arm $5^a$ is likewise drawn back to normal position by a tension spring $5^b$ fastened to an arm $5^c$ which projects from the casing of the valve.

$5^d$ is a stop for limiting the return movement of the arm $5^a$ and $4^c$ is a stop for limiting the return movement of arm $4^a$.

Tiller ropes 34, which have already been briefly referred to, are arranged in a well-known manner, as diagrammatically shown in Fig. 1. In said figure the upper ends of said ropes are shown attached to the tension yoke 138. 139 designates the traveling device operated by the car lever 141. 142 and 143 are cable guide pulleys over which the tiller ropes are conducted to the outer tiller wheel 32. To the lower end of cylinder 52 leads the supply pipe 137 which branches off from the pilot supply pipe 83 already referred to. Said supply pipe 137 supplies continuous pressure around plunger 54 beneath piston 52', while a branch 137' of said pipe supplies continuous pressure above piston 53' and around plunger 71.

The differential lever 76 performs its functions in a manner known to those skilled in the art, but to bring out the invention more clearly a brief statement will be made of the manner in which said lever operates in connection with the pilot valve and main valve. Referring to Fig. 11, the plunger 124, operating rod 75, and pilot operating rod 79 are each represented by a single line and the lever 76 is also represented by a single full line in the lap position, the various other positions of each lever being indicated by dotted lines. The full line of Fig. 11 represents the lever 76 in the position said lever assumes when the main valve is in the position of Fig. 10 and the pilot valve in the position of Fig. 3,—that is the lap positions. $a$ designates the point at which the lever 76 is pivoted to the rod 75, $b$ the point at which the lever is pivoted to the pilot valve operating rod 79, and $c$ the point of pivoting said lever of the plunger 124, these points being those through which the lever extends when the valves are in lap position. When the tiller wheel is rotated to depress the free end of crank arm 25 (see Fig. 3) the operating rod 75 is depressed bringing the upper end thereof and that portion of the lever 76 to the point $a''$ operating said lever 76 upon the point $c$ as fulcrum thus bringing the right end of said lever to the point $b''$ and depressing pilot valve operating rod 79 rotating the pilot valve plug to the position in which communication is had between the casing ports 86 and 84' through the plug port 101, and pressure is therefore relieved from the lower end of cylinder 127 (see Fig. 10) below piston head 126 through pipe 85 and out the discharge pipe 87. The result will be that the plunger 124 will be depressed by the constant pressure above piston head 126 and the lever 76 will be operated over the point $a''$ as fulcrum causing the lever to assume the position $c''$, $a''$ and $b$. The effect of this last operation will be to bring the pilot valve to lap position at a time when the plug ports of the main valve are turned to permit the pressure to escape from the bottom of the main elevator operating cylinder 17. If the tiller wheel had been rotated twice as far, the upper end of the operating rod 75 would have been depressed twice as far, for example to the point $a^3$ with the result that the plunger 124 would have moved down twice as far, say to the point $c^3$ before the right end of the lever 76 and top of pilot valve rod 79 would have been brought to $b$, the lap position. The axis of the lever 76 would then have been $c^3$, $a^3$ and $b$.

In order to bring the main valve back to lap position to stop the ascent of the elevator car, the tiller wheel is operated to bring the upper end of the operating rod 75 from the point $a''$ up to the point $a$ thus operating the lever upon the fulcrum $c''$ and bringing the right end thereof from the point $b$ up to the point $b'$ raising the pilot valve rod 79 and turning the port 97 of the pilot valve to supply pressure from pipe 83 through pipe 85 to the bottom of the cylinder 127 thereby raising the plunger 124 and operating the lever 76 upon the point $a$ as fulcrum until the left-end of the lever has been moved from $c''$ to $c$ and the right-end thereof been brought down from $b'$ to $b$. The axis of the lever will then be $c$, $a$, $b$.

A reverse series of operations to those already described will cause the elevator carriage to descend and be brought to a stop during its descent. In moving the pilot valve to cause the descent of the elevator the casing ports 82 and 84 are put into communication with each other through the plug port 97 to supply pressure from pipe 83 to the bottom of cylinder 127 by way of pipe 85 raising the plunger 124.

The upper end of the operating rod 75 may move through the point $a'$ up to the point $a^4$ and the upper end of the plunger 124 may move through the point $c'$ to the point $c^4$. The range of movement of pilot valve operating rod is from $b^3$ to $b^4$, depending on the movement between $a^3$ and $a^4$, which movement also controls the movement between $c^3$ and $c^4$. The movement of operating rod 75 between $a^3$ and $a^4$ is always the primary operation upon which the other movements depend.

This invention may be embodied in a great variety of forms without departing from the scope of the appended claims. For example, a tiller member other than that provided by the tiller wheels 31 and 32 might be employed in connection with the means for automatically disconnecting the tiller connections from the tiller member and then operating the main valve to stop the elevator car.

I claim:

1. In a hydraulic elevator, the combination, with the main hoisting cylinder, piston therein, elevator car, and tiller connections, of an inner tiller wheel, an outer tiller wheel operatively connected with said connections, said outer tiller wheel being disconnectively mounted on said inner tiller wheel to normally rotate therewith, a shaft to which said inner wheel is fixed, means to automatically disconnect said inner wheel from said outer wheel when the elevator car approaches one of the limits of its travel, and means to automatically stop said piston after the disconnection of the outer tiller wheel from the inner tiller wheel.

2. In a hydraulic elevator, the combination, with the main hoisting cylinder, piston therein, elevator car and tiller connections, of a tiller wheel operated by said connections, a main valve to control the operation of said piston, devices between said wheel and main valve to operate the same, and means to automatically close the valve and disconnect said wheel from said devices when the elevator car approaches one of the limits of its travel.

3. In a hydraulic elevator, the combination with the main hoisting cylinder, elevator car, and tiller connections, of a tiller wheel operated by said connections, a main valve to control the operation of said piston, devices between said wheel and said main valve to operate the same, means to automatically disconnect said wheel from said devices when the elevator car approaches one of the limits of its travel, and means to automatically operate said main valve after the disconnection of said wheel from said mechanism.

4. In a hydraulic elevator, a double tiller wheel comprising an inner and an outer wheel, a dog carried by one of said wheels and normally engaging the other wheel to cause said wheels to rotate together, means to operate said dog when the elevator car approaches a limit of its travel to disconnect said wheels from each other to rotate independently, and means to automatically cause said dog to connect said wheels together again when the tiller ropes are brought to a position mid-way between the limits of their extreme travel.

5. In a hydraulic elevator, a double tiller wheel consisting of an inner and an outer wheel, a dog carried by one of said wheels and normally engaging the other wheel to cause said wheels to rotate together, a pressure supply, a limit cylinder operatively connected with said supply, a plunger in said cylinder and means operated thereby to operate said dog, a valve to control the supply of fluid to said cylinder, and means to automatically operate said valve when the elevator car approaches one of the limits of its travel.

6. In a hydraulic elevator, a car, operating means therefor including a main valve, valve-operating means embodying tiller ropes and a double tiller wheel comprising an inner and an outer wheel, said outer wheel disconnectively and rotatively mounted on said inner wheel, means normally connecting said wheels together to cause the same to rotate as one part, means to operate said connecting means when the elevator car approaches a limit of its travel to disconnect said wheels from each other to allow them to rotate independently, means to automatically operate said connecting means to again connect said wheels together when the tiller ropes are operated in a manner to maintain the elevator car stationary, and means to restore the main valve to central position.

7. In a hydraulic elevator, the combination of the car and operating means including a valve, valve operating means including tiller ropes and a double tiller wheel comprising an inner wheel and an outer wheel rotatively mounted on said inner wheel, a dog carried by said inner wheel and movable in a radial direction with relation thereto, there being a notch in said outer wheel into and out of engagement with which said dog is adapted to move, means to operate said dog when the elevator car approaches a limit of its travel to withdraw said dog from said notch, means to automatically cause said dog to engage said notch when the tiller ropes are brought to a position maintaining the elevator car stationary, and means to restore the main valve to central position.

8. In a hydraulic elevator, the combination, of the car, and operating means including a valve and a traveling sheave, valve operating means including tiller ropes and a double tiller wheel comprising an inner wheel and an outer wheel rotatively mounted on said inner wheel, a dog carried by said inner wheel and movable in a radial direction with relation thereto, there being a notch in said outer wheel into and out of engagement with which said dog is adapted to move, said dog having a slot cut transversely thereacross, a lever pivoted between its ends and having a flattened arm curved in cross-section the end of which engages within said slot to permit the dog to move along the end of said extension during the partial rotation of said inner wheel, a piston cylinder, a piston in said cylinder, means to communicate the movement of said piston to said lever, a pressure supply, a conduit leading from said supply to said piston to operate the same, a valve to control the flow of fluid through said conduit, means to automatically operate said valve when said car approaches a limit of its travel, and means to restore said main valve to central position.

9. In a hydraulic elevator, the combination, with the elevator car, hoisting cylinder, piston therein, main valve to control the movements of said piston, and tiller connections, of a tiller wheel, said tiller wheel comprising an inner and an outer member rotatable about a common axis, means between said inner tiller wheel and said main valve to operate the same, and means for automatically disconnecting said outer member from said inner member and closing the valve when the elevator car approaches the upper or lower limit of its travel.

10. In a hydraulic elevator, the combination with the elevator car, the traveling sheave, cylinder and piston for operating said sheave, and pressure supply, of a main valve to control the supply of pressure to said cylinder, said main valve including a hollow plug having ports through the wall thereof at all times admitting pressure from the supply to the interior of said plug, said cylinder being provided with an extension in constant communication with the interior of said plug permitting the fluid pressure in the interior of said plug to have access to both ends of said plug, an upper limit valve, a lower limit valve, a part carried by said traveling sheave to operate the top limit valve when the elevator car approaches the top limit of its travel and to operate the bottom limit valve when the elevator approaches the lower limit of its travel, pressure actuated means for said main valve, a valve to control said means, and mechanism controlled by said top and bottom limit valves to actuate said valve.

11. In a hydraulic elevator, a piston cylinder, a piston in said cylinder, the chamber of said cylinder being provided with a lateral extension, a frusto-conical shell mounted in said extension to form a valve seat, a hollow frusto-conical valve plug rotatively fitted in said seat, and a radial operating arm extending from said plug and operatively connected with said piston, the interior of said plug and piston cylinder being continually subjected to pressure from the supply, said extension of the piston chamber permitting such pressure to have continual access to the ends of said plug.

12. In a hydraulic elevator, the combination with the main operating cylinder, of a main valve for controlling the supply of pressure to its piston, said valve comprising a casing having a frusto-conical valve seat, a plug rotatively fitted in said seat, a radial operating arm carried by said plug, and a piston operatively connected with said radial arm, a piston cylinder in which said piston moves, said piston consisting of a plunger having a longitudinal slot therein, a connecting rod pivotally fastened to one end of said slot, the other end of said rod being pivotally connected to the outer end of said radial arm, and means for controlling the supply of pressure to said last-named cylinder to operate said main valve.

13. In a hydraulic elevator, the combination, with the main hoisting cylinder, piston therein, elevator car, tiller member and main valve, and connections to operate said tiller member from the car; of automatic means for rendering said connections inoperative when the elevator car approaches a limit of its travel and to automatically operate said main valve to stop the elevator car.

14. In a hydraulic elevator, the combination with a main hoisting cylinder, a piston therein, an elevator car, mechanism for controlling the movements of said piston including a tiller member and connections to operate the same from the car; of a limit piston and valve, means for operating the same, means operated by the initial movement of said limit piston to render said tiller connections inoperative, and means operated by a further movement of said limit piston to stop the elevator car through the medium of the aforesaid mechanism.

15. In a hydraulic elevator, the combination, with the main hoisting cylinder, piston therein main valve, elevator car, and tiller connections, of a tiller member comprising rotatable elements, a radially movable dog carried by one of said elements to disconnectively engage the other element, a part having a curved portion engaging said dog to move the same radially, said dog being normally slidable along said curved portion, and means to automatically operate said part and close said valve when the elevator car approaches a limit of its travel.

16. In a hydraulic elevator, the combination, with the main hoisting cylinder, piston therein main valve, elevator car, and tiller connections; of an inner tiller wheel, an outer tiller wheel over which said connections are led, said outer tiller wheel being mounted in disconnective relation to the other tiller wheel to normally rotate therewith, a dog carried by one of said wheels to disconnectively engage the other wheel, means to operate said dog, a hydraulically operated member to operate said dog-operating means, a limit valve to control the operation of said hydraulically operated means, and means to automatically operate said valve and to close the main valve when the elevator car approaches a limit of its travel.

17. In a hydraulic elevator, the combination, with the main hoisting cylinder, piston therein, elevator car, and tiller connections; of an inner tiller wheel, an outer tiller wheel over which said connections are led, said outer tiller wheel being mounted in disconnective relation to the other tiller wheel to normally rotate therewith, a recessed dog carried by one of said wheels to disconnectively engage the other wheel, an upper lever and a lower lever each having an arm provided with a curved portion normally in sliding engagement with the recess in said dog, said levers being spaced apart slightly more than the width of said dog to allow the dog to disengage both of said members when the tiller connections are operated to stop the elevator car, hydraulically operated pistons, means carried by one of said pistons to engage the upper lever in its descent, means carried by the other piston to engage the other lever in its ascent to operate said levers at such times and thereby withdraw said dog from engagement with the outer tiller wheel, a limit valve to control the pressure to each of said hydraulically operated pistons, means for automatically operating one of said limit valves when the elevator car approaches either limit of its travel, and means to thereafter automatically operate the main valve to stop the elevator car.

18. In a hydraulic elevator, the combination, with the main hoisting cylinder, piston therein main valve, elevator car, and tiller connections, of a tiller member comprising rotatable elements, a radially movable dog carried by one of said elements to disconnectively engage the other element, a part having a curved portion engaging said dog to move the same radially, said dog being normally slidable along said curved portion, means to automatically operate said part and to close the main valve when the elevator car approaches a limit of its travel, said means including a limit cylinder, a piston therein, means for automatically supplying pressure to said limit cylinder, and a roller carried by said last named piston, the aforementioned part having a cam surface in the path of said roller.

19. In a hydraulic elevator, hydraulic means for operating the same, controlling means, manual operating means for said controlling means embodying a device in the car adapted to be adjusted to stopping and starting positions, limit-stop devices for actuating the operating means and rendering said manual means inoperative, said manual means embodying means for restoring it to operative condition when the device in the car is adjusted to stopping position.

20. The combination in a hydraulic elevator, of manually controlled means for controlling the car adapted to be adjusted in the car to stopping and starting positions, limit-stop devices associated therewith for automatically stopping the car and rendering said manually controlled means inoperative, said manually controlled means embodying devices whereby when the same are adjusted to stopping position after an operation of the limit-stop devices they are again rendered effective.

21. In a hydraulic elevator, a car, a cylinder, a piston and means connecting therewith for operating the car, a main valve hydraulic actuating means therefor, devices to control said actuating means, means for manually operating said controlling means from the car, and limit-stop devices for automatically assuming control of said hydraulic means and rendering inoperative the manual operating means, for the purpose set forth.

22. In a hydraulic elevator, the combination, of a car, a cylinder and means for operating the car from the cylinder, a main valve, actuating and controlling means therefor, automatic limit-stop devices for actuating said controlling mechanism to stop the car, and manual operating means for actuating said controlling means independently of the automatic devices and embodying means for restoring its control after the automatic devices are operated, said automatic devices embodying means for rendering inoperative the manual means.

23. In combination with a hydraulic elevator, of hydraulic limit-stop devices embodying two valves one for the upper limit and one for the lower limit, two opposed cylinders connected respectively to said valves, and means including said cylinders for stopping the car-operating means, substantially as set forth.

24. In an elevator, the combination of a car and means for raising and lowering said car, a controlling device for said means, means for actuating said controlling device manually from the car to stop or to start or reverse the car at any point in its travel, automatic limit-stop devices and means enabling the same to actuate said controlling device, whereby upon actuation of either limit-stop device the controlling device will be disconnected from the manually actuated means and actuated by the limit-stop controlling means.

25. In an elevator, the combination of a car, means for raising and lowering the same, controlling devices for said means through the medium of which the car may be stopped or started or reversed at any point in its travel, manual means for actuating said controlling devices from the car, automatic limit stopping means to actuate said controlling devices, and means to enable the automatic devices to actuate the controlling devices and to disconnect the manual means when the limit stop devices are actuated.

26. In an elevator, the combination of a car, means for raising and lowering the same, controlling devices for said means through the medium of which the car may be stopped or started or reversed at any point in its travel, manual means for actuating said controlling devices from the car, automatic limit stopping means to actuate said controlling devices, and means to enable the automatic devices to actuate the controlling devices and to disconnect the manual means when the limit stop devices are actuated, and means for restoring the connection of the manual means to the controlling devices when the manual means in the car are brought to stopping position.

27. In combination with a car, means for operating the same, a controlling device therefor whereby the car may be stopped or started or reversed at any point in its travel and means manually operable from the car for operating said controlling device, of means for automatically actuating the controlling device when the car approaches either limit of its travel including devices for disconnecting the manual means and also means for restoring connection with the manual means.

In testimony whereof I have hereunto signed my name in the presence of two subscribing witnesses at Los Angeles, in the county of Los Angeles and State of California, this 25th day of March 1909.

SPENCER G. NEAL.

Witnesses:
W. H. SHEASBY,
ALBERT H. MERRILL.